United States Patent
Neuweg

(10) Patent No.: US 12,063,423 B1
(45) Date of Patent: Aug. 13, 2024

(54) ENHANCED INTERACTIVE WEB FEATURES FOR DISPLAYING AND EDITING DIGITAL CONTENT

(71) Applicant: Nova Modum Inc, Wilmington, DE (US)

(72) Inventor: Eric Neuweg, Wilmington, DE (US)

(73) Assignee: Nova Modum Inc, Wilmington, DE (US)

( * ) Notice: Subject to any disclaimer, the term of this patent is extended or adjusted under 35 U.S.C. 154(b) by 0 days.

(21) Appl. No.: 16/578,988

(22) Filed: Sep. 23, 2019

Related U.S. Application Data

(60) Provisional application No. 62/735,562, filed on Sep. 24, 2018.

(51) Int. Cl.
| | |
|---|---|
| *H04N 21/8545* | (2011.01) |
| *G06F 3/04845* | (2022.01) |
| *G06F 16/957* | (2019.01) |
| *G06T 19/00* | (2011.01) |
| *H04N 21/431* | (2011.01) |
| *H04N 21/4722* | (2011.01) |
| *H04N 21/8541* | (2011.01) |

(52) U.S. Cl.
CPC ..... *H04N 21/8545* (2013.01); *G06F 3/04845* (2013.01); *G06F 16/9577* (2019.01); *G06T 19/006* (2013.01); *H04N 21/4316* (2013.01); *H04N 21/4722* (2013.01); *H04N 21/8541* (2013.01)

(58) Field of Classification Search
CPC .................................................. H04N 21/8545
See application file for complete search history.

(56) References Cited

U.S. PATENT DOCUMENTS

| | | | |
|---|---|---|---|
| 6,246,402 B1 * | 6/2001 | Setogawa | G11B 27/34 715/201 |
| 6,282,713 B1 * | 8/2001 | Kitsukawa | H04N 21/4784 725/36 |
| 6,538,654 B1 * | 3/2003 | Rose | H04N 21/8146 375/E7.005 |
| 8,352,980 B2 * | 1/2013 | Howcroft | H04N 21/25891 725/35 |
| 8,631,453 B2 * | 1/2014 | Sadja | H04N 21/4722 725/40 |
| 8,718,924 B2 * | 5/2014 | Kim | G09B 29/106 701/425 |
| 9,009,619 B2 * | 4/2015 | Bloch | G11B 27/34 715/772 |
| 9,082,092 B1 * | 7/2015 | Henry | H04N 21/8541 |
| 9,507,417 B2 * | 11/2016 | Dal Mutto | G06F 3/0482 |
| 9,565,476 B2 * | 2/2017 | Bakke | H04N 21/42224 |
| 9,626,697 B2 * | 4/2017 | Rathus | G06Q 30/0255 |
| 9,792,957 B2 * | 10/2017 | Bloch | G11B 27/34 |

(Continued)

*Primary Examiner* — An Son P Huynh
(74) *Attorney, Agent, or Firm* — Erise IP, P.A.

(57) ABSTRACT

A system and method of presenting interactive content to a user is presented herein. In some embodiments, an interactive story is presented to a user via a computing device. Interactive features are presented such that the user may select the features dictating content that is provided to the user. The content may be presented in the form of audio, video, haptics, as well as other methods which may also be interactive. In some embodiments, the user's location may be used with the content to provide a fully interactive and unique experience to the user.

20 Claims, 9 Drawing Sheets

(56) References Cited

U.S. PATENT DOCUMENTS

| | | | |
|---|---|---|---|
| 10,057,652 B2* | 8/2018 | Ellis | H04N 21/47211 |
| 10,070,192 B2* | 9/2018 | Baratz | H04N 21/4788 |
| 10,147,461 B1* | 12/2018 | Bates | H04N 21/435 |
| 10,346,003 B2* | 7/2019 | Selfridge | G06F 3/0484 |
| 10,419,790 B2* | 9/2019 | Gersten | H04N 21/454 |
| 10,735,131 B2* | 8/2020 | Hodge | H04W 4/02 |
| 10,743,131 B2* | 8/2020 | Shingler | H04N 5/23216 |
| 10,755,747 B2* | 8/2020 | Bloch | G11B 27/034 |
| 10,970,843 B1* | 4/2021 | Olsen | H04N 21/4316 |
| 11,232,458 B2* | 1/2022 | Bloch | G06Q 30/0241 |
| 11,412,276 B2* | 8/2022 | Bloch | H04N 21/2365 |
| 11,553,228 B2* | 1/2023 | Zito, Jr. | H04N 21/251 |
| 2002/0053089 A1* | 5/2002 | Massey | H04N 21/458 725/38 |
| 2006/0034583 A1* | 2/2006 | Shimizu | H04N 21/23424 |
| 2006/0064733 A1* | 3/2006 | Norton | H04N 21/42646 725/135 |
| 2007/0066396 A1* | 3/2007 | Weston | A63F 13/235 463/39 |
| 2009/0018766 A1* | 1/2009 | Chen | G01C 21/3611 701/533 |
| 2009/0029771 A1* | 1/2009 | Donahue | A63F 13/533 463/31 |
| 2009/0138805 A1* | 5/2009 | Hildreth | H04N 21/4751 715/745 |
| 2010/0131865 A1* | 5/2010 | Ackley | G06F 3/011 715/757 |
| 2010/0304806 A1* | 12/2010 | Coleman | A63F 13/58 463/2 |
| 2010/0321389 A1* | 12/2010 | Gay | G06T 15/00 345/427 |
| 2011/0069940 A1* | 3/2011 | Shimy | H04N 21/42201 386/296 |
| 2011/0279311 A1* | 11/2011 | Hamano | G06F 16/9535 707/769 |
| 2011/0307924 A1* | 12/2011 | Roberts | H04N 21/4532 725/44 |
| 2012/0008916 A1* | 1/2012 | Lane | H04N 21/8583 386/E9.046 |
| 2012/0054811 A1* | 3/2012 | Spears | H04N 21/4722 725/106 |
| 2012/0060189 A1* | 3/2012 | Ellis | H04N 7/163 725/44 |
| 2012/0159530 A1* | 6/2012 | Ahrens | H04N 21/45457 725/32 |
| 2012/0166532 A1* | 6/2012 | Juan | G06Q 30/0224 709/204 |
| 2013/0031582 A1* | 1/2013 | Tinsman | H04N 21/4316 725/36 |
| 2013/0050268 A1* | 2/2013 | Lohrenz | G06F 3/013 345/660 |
| 2013/0132959 A1* | 5/2013 | Moore | G06Q 30/02 718/100 |
| 2013/0215116 A1* | 8/2013 | Siddique | G06Q 20/204 345/420 |
| 2013/0268955 A1* | 10/2013 | Conrad | H04N 21/8549 725/12 |
| 2013/0335227 A1* | 12/2013 | Iida | H04W 52/0254 340/575 |
| 2014/0068692 A1* | 3/2014 | Archibong | H04L 67/22 725/116 |
| 2014/0082666 A1* | 3/2014 | Bloch | G06F 3/04842 725/37 |
| 2014/0129337 A1* | 5/2014 | Otremba | G06Q 30/0261 705/14.58 |
| 2014/0156184 A1* | 6/2014 | Chiu | G01C 21/3679 701/519 |
| 2014/0168056 A1* | 6/2014 | Swaminathan | G06F 3/0481 345/156 |
| 2014/0282013 A1* | 9/2014 | Amijee | G06F 3/0482 715/732 |
| 2014/0287779 A1* | 9/2014 | O'Keefe | H04L 67/52 455/456.3 |
| 2014/0378220 A1* | 12/2014 | Fuller | A63F 13/822 463/31 |
| 2015/0067723 A1* | 3/2015 | Bloch | H04N 21/4325 725/32 |
| 2015/0070516 A1* | 3/2015 | Shoemake | H04N 21/4542 348/207.11 |
| 2015/0168162 A1* | 6/2015 | Subramanian | G01C 21/28 701/523 |
| 2015/0279081 A1* | 10/2015 | Monk | A63F 13/65 345/419 |
| 2015/0293675 A1* | 10/2015 | Bloch | G06F 3/04842 715/723 |
| 2015/0375115 A1* | 12/2015 | Bunting | A63F 13/214 463/29 |
| 2016/0037217 A1* | 2/2016 | Harmon | H04N 21/4542 725/9 |
| 2016/0089610 A1* | 3/2016 | Boyle | A63F 13/65 463/7 |
| 2016/0094875 A1* | 3/2016 | Peterson | H04N 21/4312 725/41 |
| 2016/0094888 A1* | 3/2016 | Peterson | H04N 21/8456 725/39 |
| 2016/0171238 A1* | 6/2016 | Sibillo | H04W 4/029 713/164 |
| 2016/0219114 A1* | 7/2016 | Keyani | G06Q 20/204 |
| 2016/0299563 A1* | 10/2016 | Stafford | G06T 19/006 |
| 2016/0381427 A1* | 12/2016 | Taylor | H04N 21/472 725/13 |
| 2017/0006322 A1* | 1/2017 | Dury | H04N 21/254 |
| 2017/0013031 A1* | 1/2017 | Kweon | H04L 65/105 |
| 2017/0056771 A1* | 3/2017 | Davis | A63F 13/47 |
| 2017/0228804 A1* | 8/2017 | Soni | H04L 67/306 |
| 2017/0262154 A1* | 9/2017 | Black | G06F 3/012 |
| 2017/0264920 A1* | 9/2017 | Mickelsen | G06V 40/174 |
| 2017/0366867 A1* | 12/2017 | Davies | H04N 21/8133 |
| 2017/0371883 A1* | 12/2017 | Bailiang | H04B 1/3827 |
| 2018/0008894 A1* | 1/2018 | Sack | A63F 13/28 |
| 2018/0012408 A1* | 1/2018 | Gentilin | H04L 67/18 |
| 2018/0036639 A1* | 2/2018 | Reid | A63F 13/52 |
| 2018/0068019 A1* | 3/2018 | Novikoff | G06F 16/7867 |
| 2018/0095635 A1* | 4/2018 | Valdivia | G06F 3/0482 |
| 2018/0146216 A1* | 5/2018 | Chang | H04L 67/01 |
| 2018/0197048 A1* | 7/2018 | Micks | B60R 1/00 |
| 2018/0293798 A1* | 10/2018 | Energin | G06F 40/169 |
| 2018/0359477 A1* | 12/2018 | Yang | H04N 19/136 |
| 2019/0046879 A1* | 2/2019 | Halper | H04N 21/2743 |
| 2019/0080342 A1* | 3/2019 | Andon | A63F 13/69 |
| 2019/0082234 A1* | 3/2019 | Greene | H04N 21/8133 |
| 2019/0191203 A1* | 6/2019 | Asbun | H04N 21/6587 |
| 2019/0200408 A1* | 6/2019 | He | H04W 24/08 |
| 2019/0230387 A1* | 7/2019 | Gersten | G06F 16/783 |
| 2019/0273972 A1* | 9/2019 | Soderbergh | H04N 21/4722 |
| 2020/0037047 A1* | 1/2020 | Cheung | H04N 21/44004 |
| 2020/0043104 A1* | 2/2020 | Ri'Chard | G06Q 50/01 |
| 2020/0076754 A1* | 3/2020 | Kim | H04L 51/222 |
| 2020/0112772 A1* | 4/2020 | Kingori | H04N 21/8541 |
| 2020/0120097 A1* | 4/2020 | Amitay | H04W 4/021 |
| 2020/0344510 A1* | 10/2020 | McMurray | H04N 21/234309 |
| 2021/0084354 A1* | 3/2021 | May, Jr. | H04N 21/2223 |
| 2021/0142226 A1* | 5/2021 | Sahni | G01C 21/00 |
| 2021/0312318 A1* | 10/2021 | Ambrozic | H04N 21/44008 |
| 2021/0385514 A1* | 12/2021 | Da Silva Pratas Gabriel | H04N 21/234345 |
| 2022/0179665 A1* | 6/2022 | Rathod | G06F 9/451 |

* cited by examiner

ENHANCED INTERACTIVE WEB FEATURES FOR DISPLAYING AND EDITING DIGITAL CONTENT

RELATED APPLICATION

This non-provisional patent application claims priority benefit, with regard to all common subject matter, of earlier-filed U.S. Provisional Patent Application No. 62/735,562 filed Sep. 24, 2018 and entitled METHOD AND SYSTEM FOR DISPLAYING AND EDITING DIGITAL COMIC PAGES WITH ENHANCED INTERACTIVE WEB FEATURES. The identified earlier-filed provisional patent application is hereby incorporated by reference in its entirety into the present application.

BACKGROUND

1. Field

Embodiments of the invention relate to providing interactive content. Specifically, embodiments of the invention provide interactive content that may be created by a creator and consumed by users. Each user may interact with the content differently and thereby receive a different experience of the content.

2. Related Art

Typically, graphic novels, digital comics, and other forms of media are accessible online without providing customization and interaction to the user. There is little to no interaction with the user essentially providing images or a book on a computer. The current state of the field provides very little interest and action on part of the user thus is lacking in utilizing new technology to increase interaction with the user.

What is needed is a system and method of creating and sharing artistic content. In some embodiments, the above-mentioned problems are solved by providing a platform for users to create content that may be interactive and catered to a viewer's preferences. The interactive content may be accessed by users, or consumers, based on the user preferences. Further, the users may interact with the content via a computing device providing information to receive badges or rewards and additional content. In some embodiments, groups of consumers may share rewards, badges, clues, and any other information. In some embodiments, the information shared, rewards, and content may be based on the consumers location or actions related to the content. This provides a fully interactive system and method for users to create and share interactive content.

SUMMARY

Embodiments of the invention address the above-described need by providing for a variety of techniques for interacting with digital comic pages provided on computing devices. In particular, in a first embodiment, the invention includes a method of presenting interactive content via at least one computing device to a user of the at least one computing device, the method comprising the steps of displaying the interactive content via the at least one computing device, wherein the interactive content comprises an interactive input, wherein the interactive content is based at least in part on information associated with the user, receiving an input via the interactive input from the user, and upon receiving the input displaying additional content.

In a second embodiment, the invention provides a method of presenting interactive content via at least one computing device to a user of the at least one computing device, the method comprising the steps of displaying the interactive content via the at least one computing device, wherein the interactive content comprises an interactive input, receiving an input via the interactive input from the user, upon receiving the input, displaying content, displaying a map comprising a location, tracking a user location, and providing location-based content based at least in part on the location and the user location.

In a third embodiment, the invention includes one or more non-transitory computer-readable media storing computer-executable instructions that, when executed by a processor, perform a method of displaying interactive content via at least one computing device, wherein the interactive content comprises an interactive input, wherein the interactive content is indicative of information associated with the user, receiving an input via the interactive input from the user, upon receiving the input, displaying additional content based at least in part on the input, and sharing the additional content with at least one other user based at least in part on at least one preference of the user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 3A:
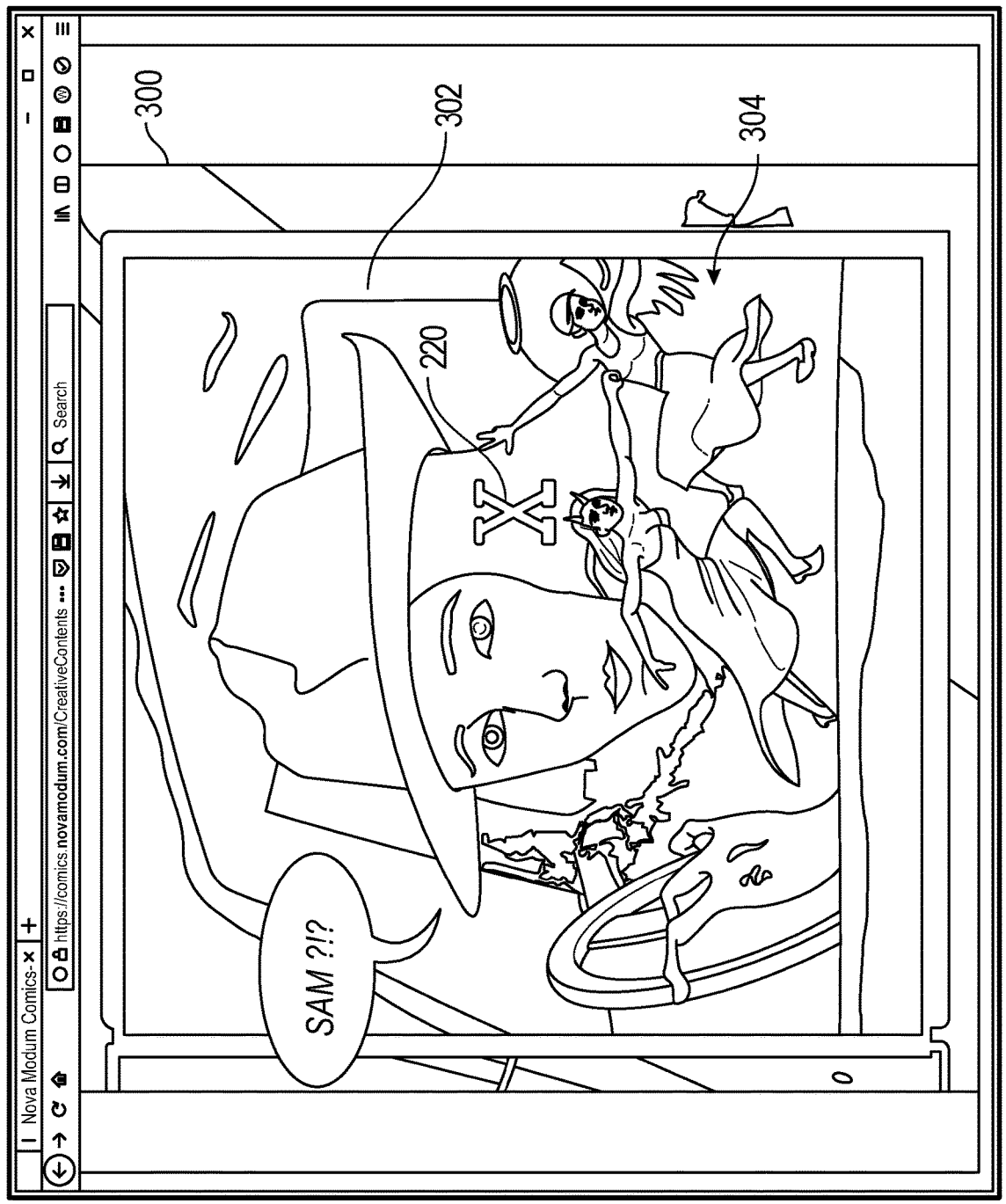
Figure 3B:
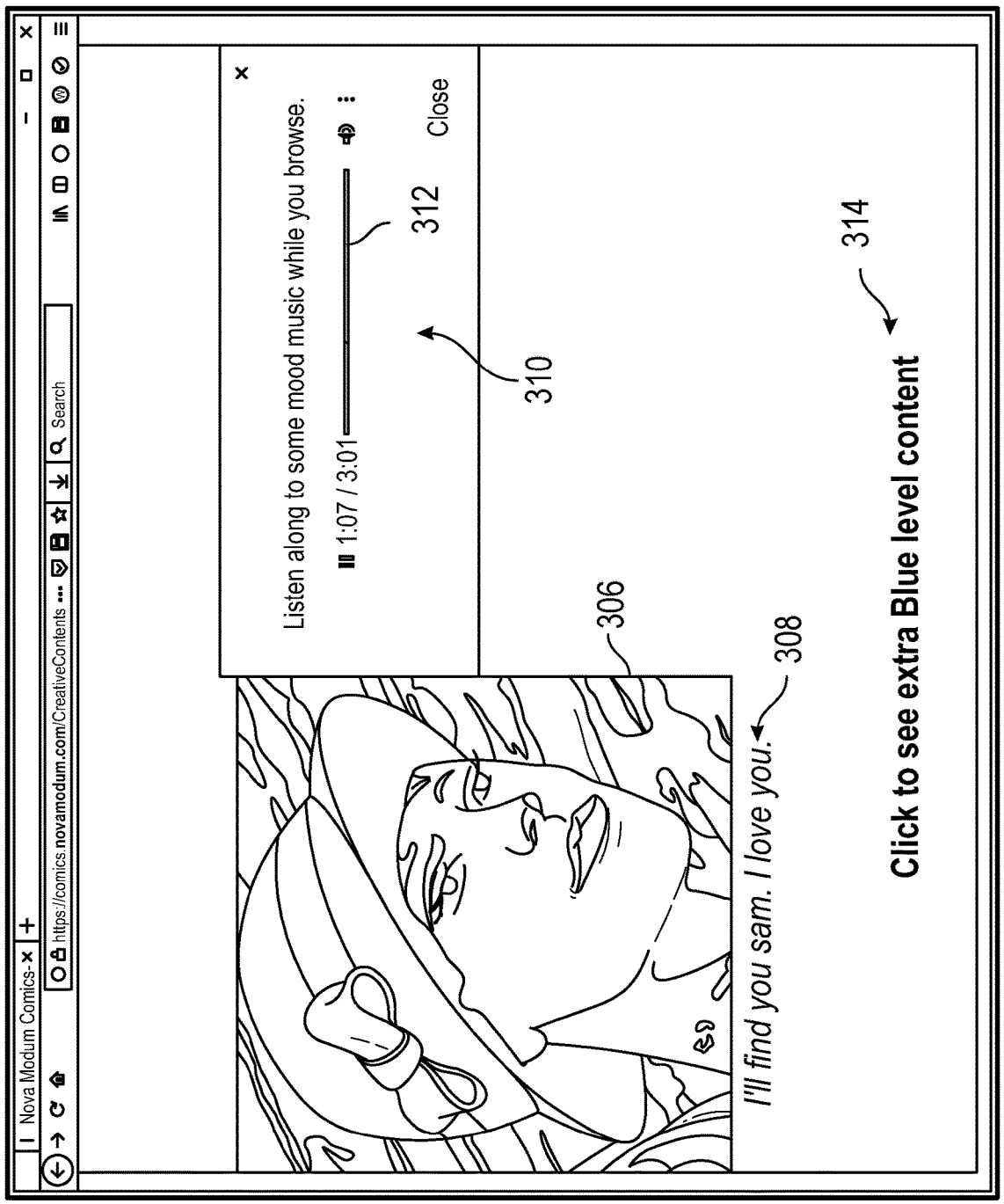
Figure 4:
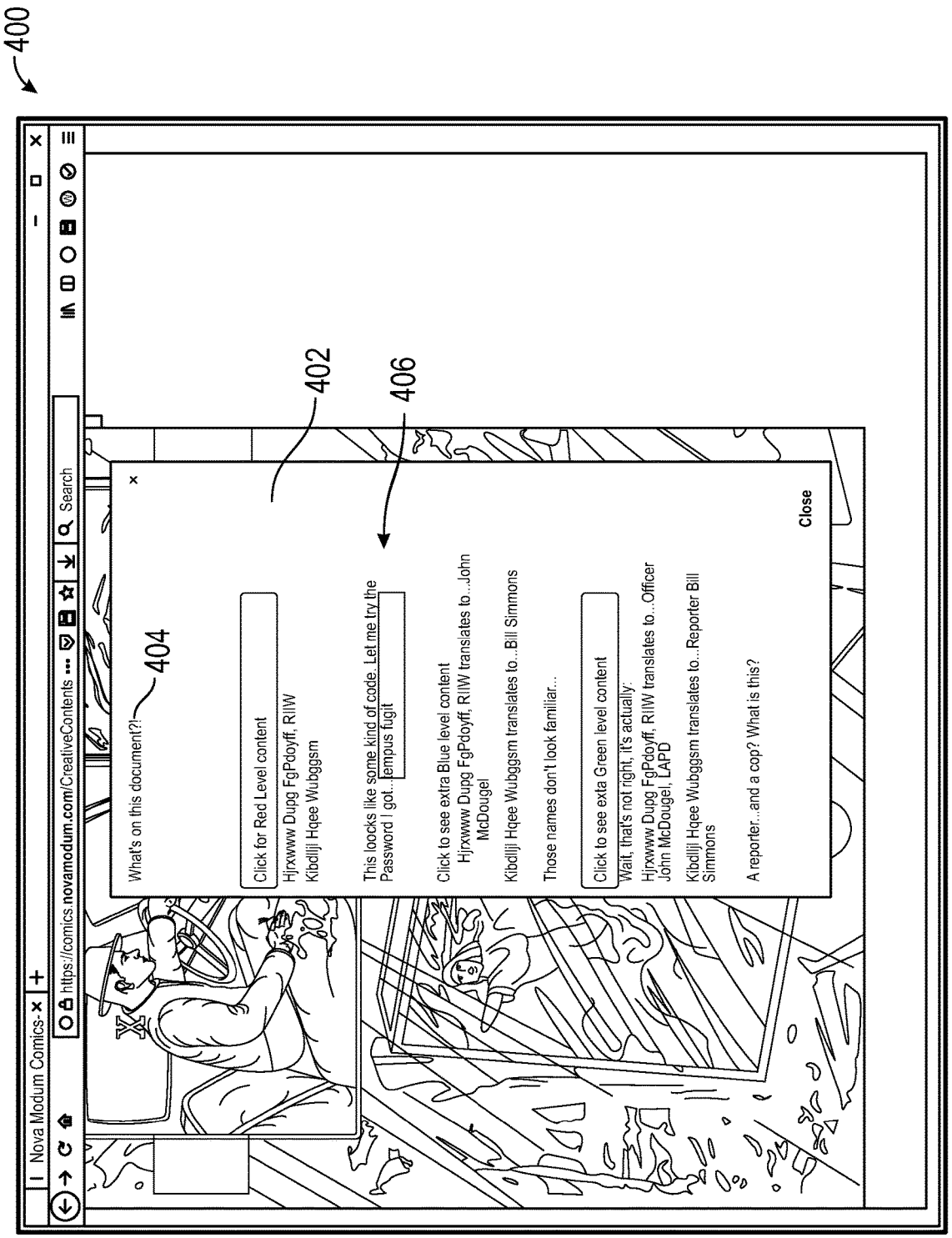
Figure 5A:
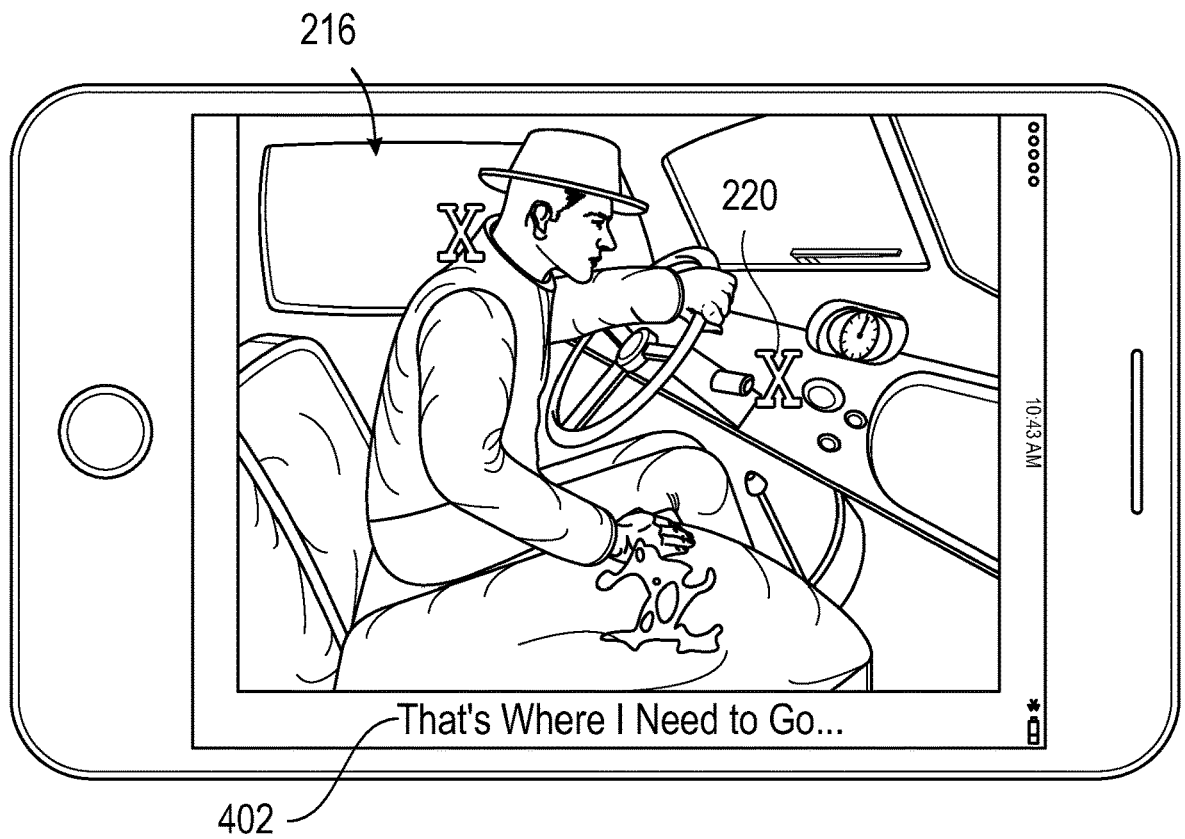
Figure 5B:
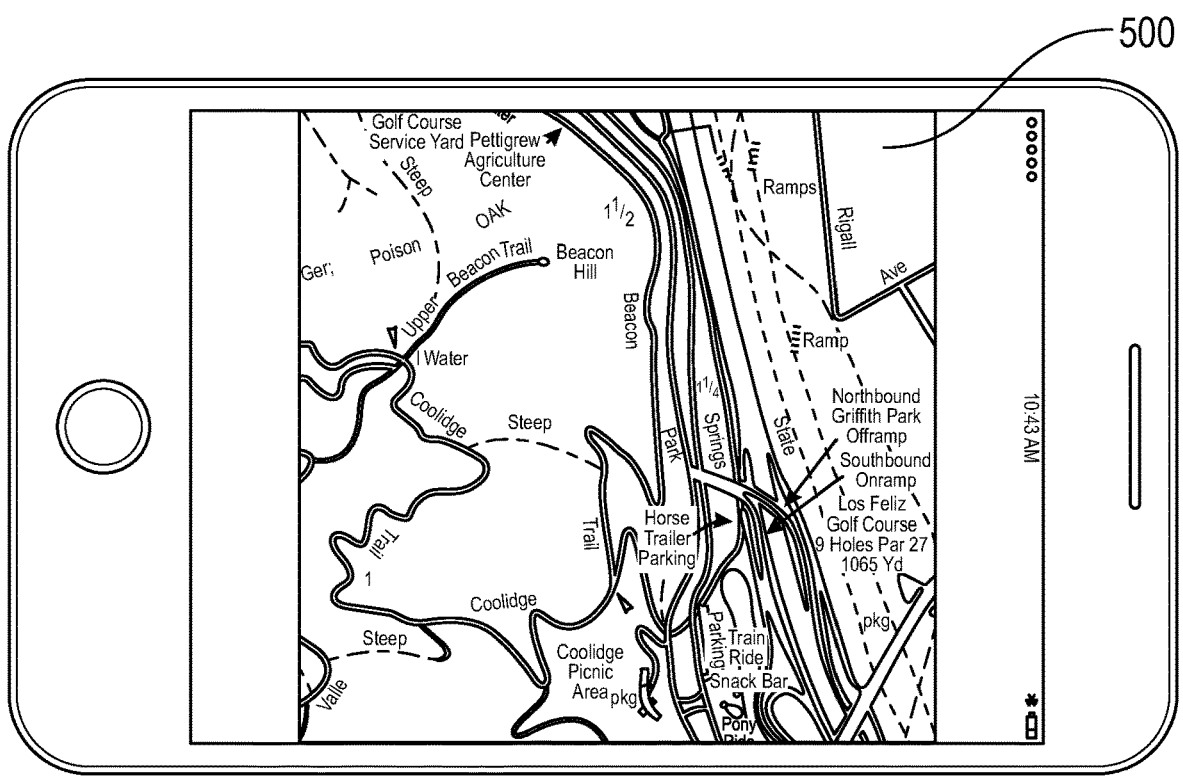
Figure 6A:
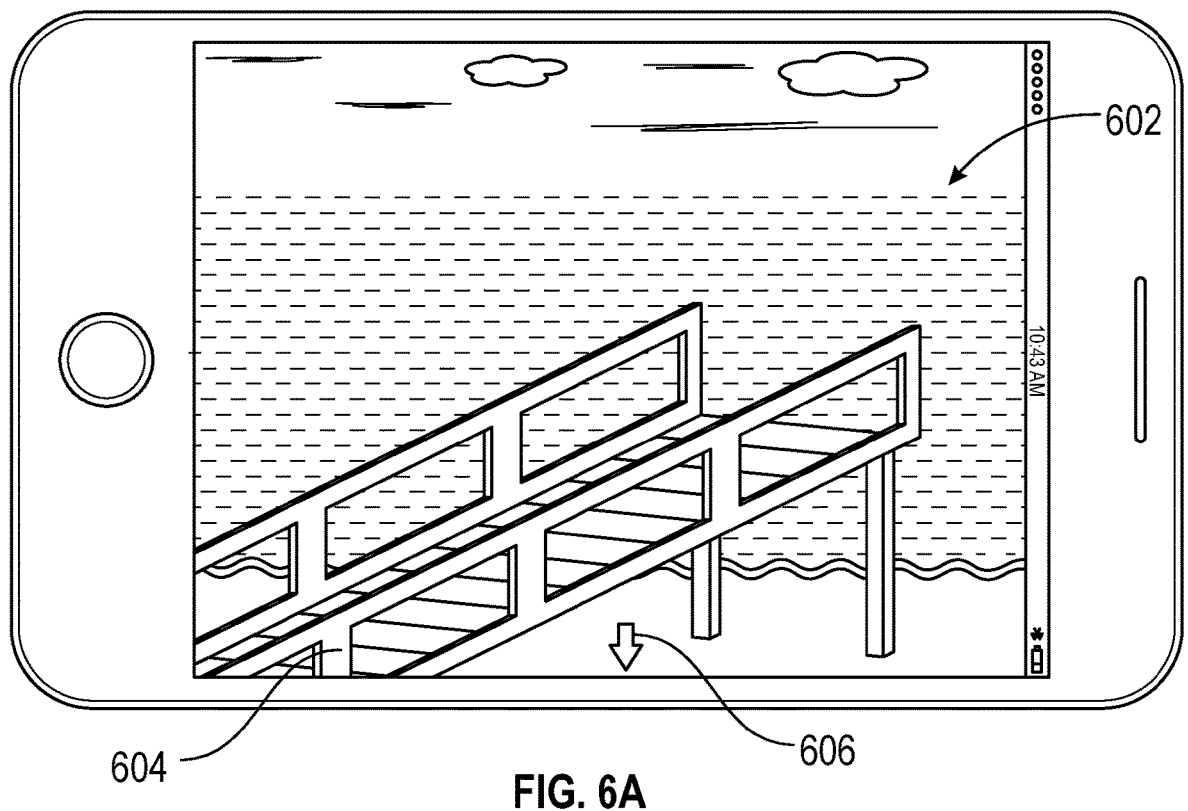
Figure 6B:
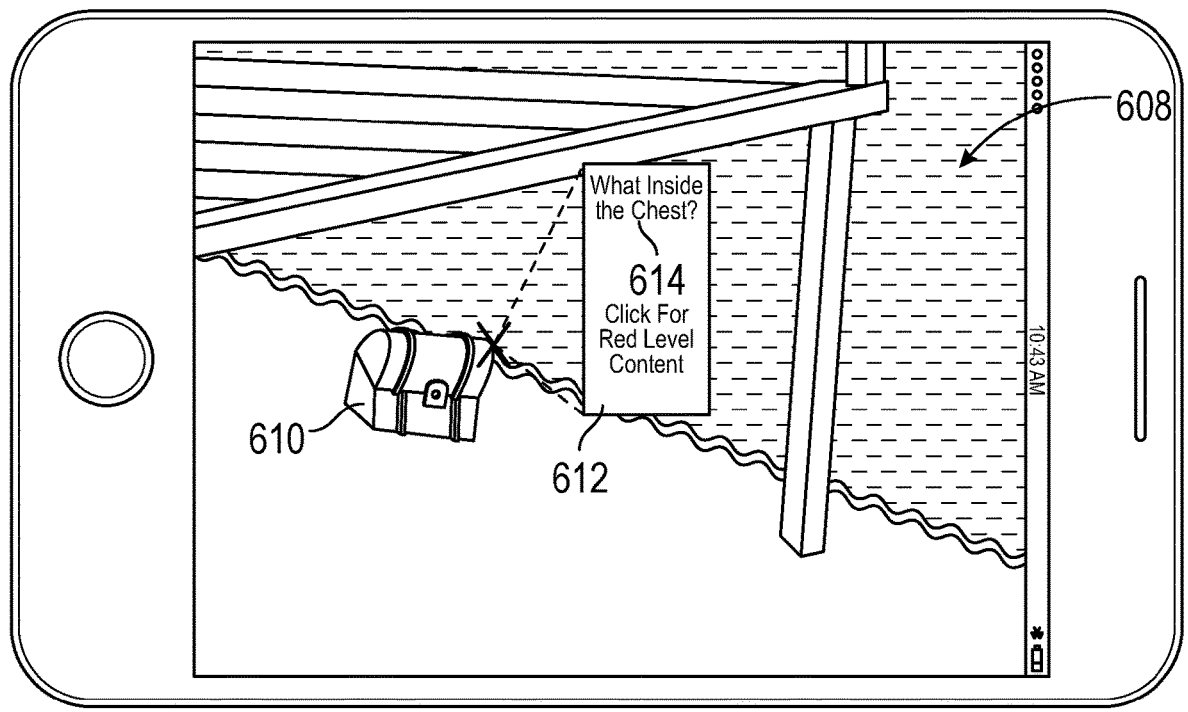
Figure 7:
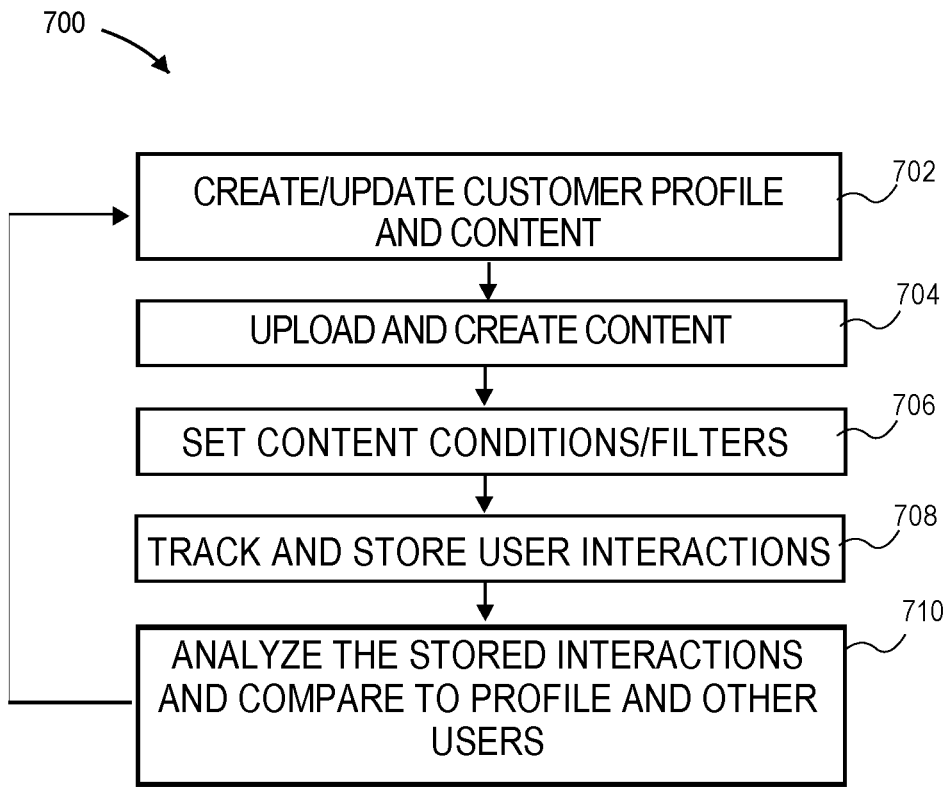
Figure 8:
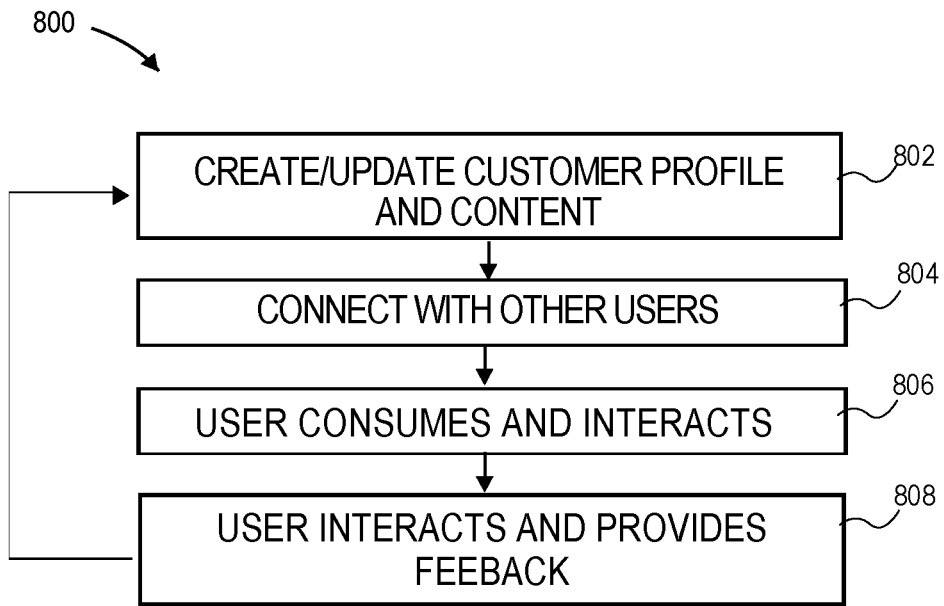

FIGS. 3A-B depict an exemplary embodiment of the invention presenting an exemplary secondary screen for users to access interactive content;

FIG. 4 depicts an exemplary embodiment of the invention presenting exemplary interactive content;

FIGS. 5A-B depict an exemplary embodiment of the invention presenting interactive content and a map associated with the content;

FIGS. 6A-6B depict an exemplary embodiment of the invention presenting exemplary interactive content;

FIG. 7 depicts a flowchart for methods in accordance with embodiments of the invention directed to creating and sharing content; and FIG. 8 depicts a flowchart for methods in accordance with embodiments of the invention directed to consuming content.

The drawing figures do not limit the invention to the specific embodiments disclosed and described herein. The drawings are not necessarily to scale, emphasis instead being placed upon clearly illustrating the principles of the invention.

DETAILED DESCRIPTION

Broadly, embodiments of the invention provide an interactive system and method for content creators to create content and share with users for consumption of the content. The content may be visual, audible, and haptic and may be customized specifically to a user's preferences. Further, the content may be provided based on time and location of the user, other users, or based on the content itself.

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
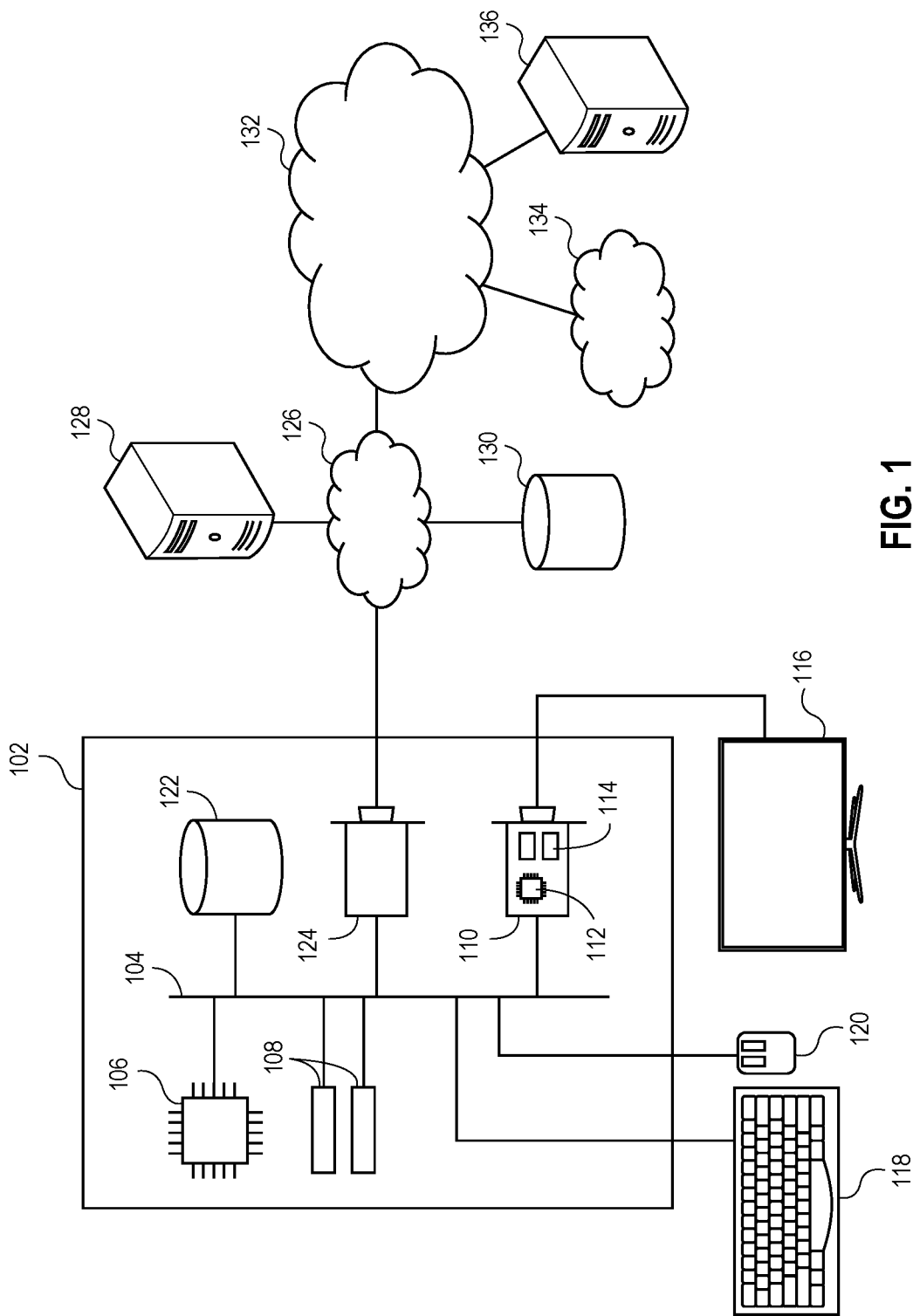
FIG. 1 depicts an exemplary hardware platform for certain embodiments of the invention.

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, the application may run on a computer or mobile device that, in some embodiments, is computer 102. In some embodiments, the application may be accessed via the computer or mobile device and run in a web-based environment from the recipient's web browser. The web-based environment may store data such that it is not required for the mobile device or computer to have downloaded and stored large amounts of data for the application. The application may access data such as object databases, user profiles, information related to other users, financial information, third-party financial institutions, third-party vendors, social media, or any other online service or website that is available over the Internet.

In some embodiments, the application may access devices associated with the computing device such as cameras, accelerometers, lights, vibration devices, any sensors, or any other peripheral devices that may enhance the experience for the user.

Broadly, embodiments of the invention relate to providing an interactive system such that users may interact with content such as, for example, comics, books, novels, and the like provided through interactive media. The interactive content may be provided on a downloaded application, through a cloud-based interaction via a downloaded application or directly through an online webpage. Embodiments of the invention may be accessed through the computer system 100 provided in FIG. 1 either from a laptop, mobile device, or any other accessible device.

In some embodiments, the digital content may be comics, webcomics, graphic novels, Manga, text (from short stories to novels or entire series), games, puzzles, or any other format or media. In some embodiments, such content may be supplemented by audio such as, for example, music, narration, or sound effects provided in combination with the visual content automatically or initiated by the user through interaction with the content. Further, the content may be provided through haptics such as vibrations of the mobile device to notify the user or enhance the experience of the user.

Figure 2:
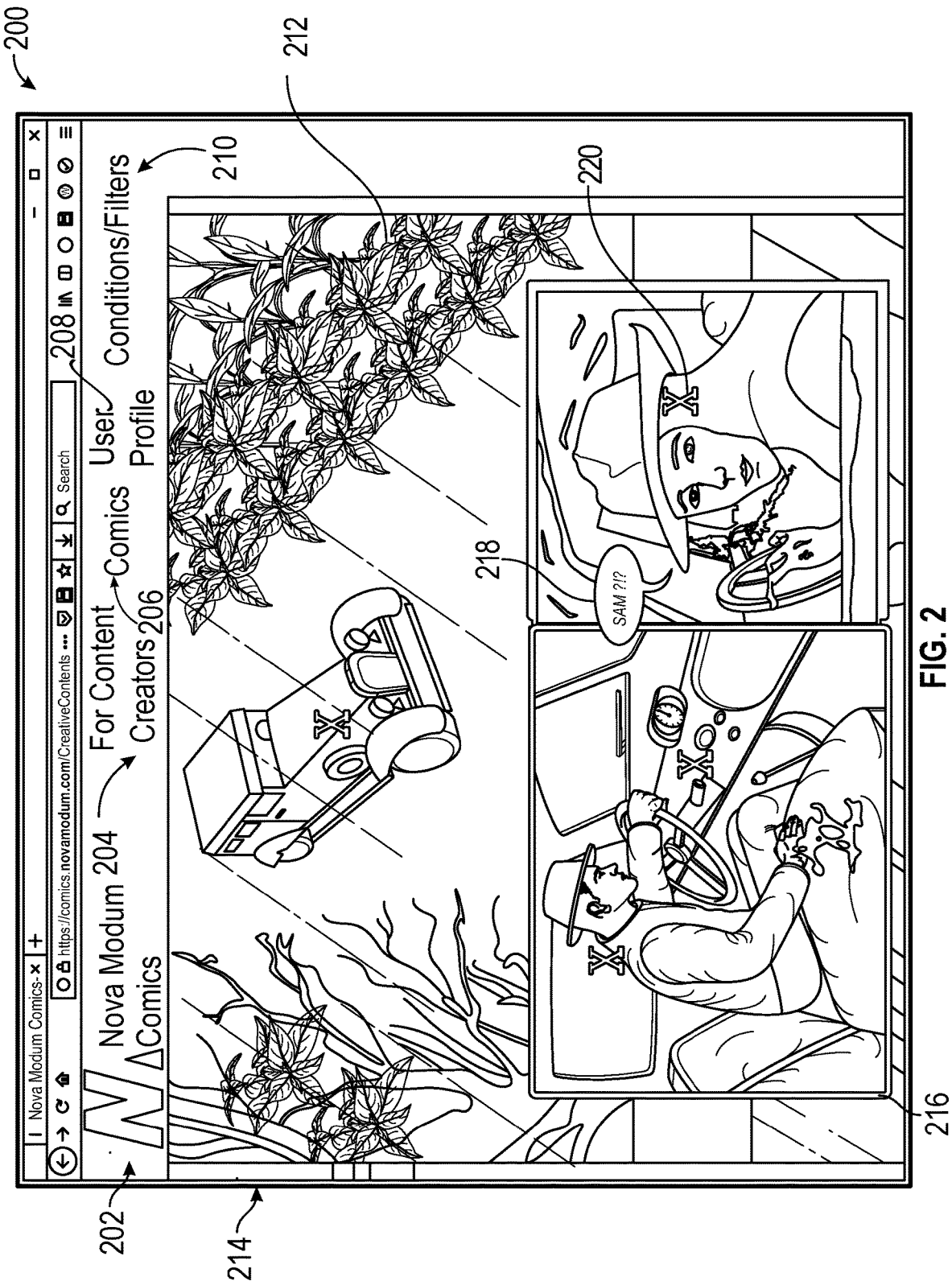
FIG. 2 depicts an exemplary embodiment of the invention presenting an exemplary primary screen for users to create and access interactive content.

FIG. 2 depicts an exemplary embodiment of the invention providing an exemplary webpage 200. The webpage 200 may provide a menu 202 for accessing different features of the application. In some embodiments, the webpage 200 is accessed via a desktop computer and in some embodiments, the webpage 200 is accessed via a mobile device. In some embodiments, the webpage 200 is an application running on the computing device as described above.

The menu may provide options to the user such as For Content Creators 204, Comics 206, User Profile 208, and Conditions/Filters 210. When a user accesses For Content Creators 204, the user may access editing features for uploading content 212 and for editing and creating the content 212. The application may provide illustration, coloring, audio and video recording and editing features as well as features to upload pre-recorded content and download any accessible content. The content 212 as depicted is a graphic novel. However, the content 212 may be any of the above described media and rewards, maps, information, dialogue, or any other information provided to the user by the application. For example, one content creator might upload a novel with a single illustration (or with no illustrations), while another might upload twenty (or any number of) images with no textual content. Any combination of content types is contemplated as being within the scope of the invention.

When the user selects Comics 206, the user may access any of the previously created content. The user may select from a library of content such as novels, music, comics, or any other content. Suggestions may also be provided based on the profile of the user as discussed below.

The user may select User Profile 208. Here, the user may find all information associated with the user such as information indicative of the user, user preferences, and user levels. The information indicative of the user may be age, residence information, location, nationality, language spoken, or any other information indicative of the user that may be useful to provide a customized experience. In some embodiments, the user preferences may comprise types of animals, favorite characters, genres, books, movies, mood, verbosity, action vs dialogue preference, or any other preference that may adjust the content 212 to better customize to the user.

The user may select Conditions/Filters 210. Here the user may create and edit conditions for the content 212. The conditions and filters for the content 212 may be based at least in part on the information indicative of the user and the user preferences. The conditions may comprise when and where to provide the content 212 as well as whether some content is filtered such as, for example, some characters may appear less frequently or more often, some violent content or content inappropriate for young audiences may be hidden or omitted, content that is less desirable based on the user preferences may be hidden and desirable content may be displayed at a higher rate. The editable features of any provided content are discussed in more detail in embodiments described below.

Further, the exemplary content 212 is displayed in FIG. 2. The content 212 may be any visual content provided such as, for example, comic, a graphic novel, any story that may be provided by the administrators or any user such as a content creator. Though the content 212 is a graphic novel as used for examples throughout, any content may be provided for any senses such as audio and haptic as described above. The content 212 depicted in FIG. 2 provides a primary screen 214 displaying a vehicle driving on a road in the rain. A smaller secondary screen 216 depicts a man in a car and another secondary screen depicts a boy that presumably sees the man and questioningly says the man's name "Sam?!?" provided by the dialogue bubble 218.

In some embodiments, the primary screen 214 may depict a more general view of the scene and the secondary screens provide a more detailed view as depicted. In some embodiments, the secondary screen 216 may be overlaid on the primary screen 214 to show a zoomed in version of a location on the primary screen 214 or show secondary content as depicted in FIG. 4. The secondary screen 216 may be automatically displayed with the primary screen 214 or, in some embodiments, may be displayed after an amount of time has passed. The amount of time and the placement of the secondary screen 214 may be configured by the administrator or customized by the user viewing the content 212 or uploading the content 212 as in the case when the user is the content creator.

In some embodiments, the user may be a content creator and may upload and create stories and content as a method of presenting the stories. The user may place illustrations, audio, interactive tools, and video on the webpage at specified coordinates by drag and drop, direct input, or any other method. The user may edit any content including audio and video recordings, text, and illustrations directly in the application. The access of the user for editing and creating may be provided by the user account as the user may be designated as a creator, a viewer, or both.

Further, in some embodiments, the user may set conditions for particular content to appear to different users. Content may be filtered in a number of ways. In particular, content may be filtered for in search, and elements of content may be filtered once an item of content is selected. Suggestions for content, such as genre of stories, and links to stories and links to other users in groups may be determined by the conditions set by the content creators. For example, the content 212 may be provided to the public to any user or only select users. In some embodiments, the users to which the content 212 is provided, suggested, or marketed may be based at least in part on the user profiles. For example, a user may list noir as a favorite genre. The content creator may list noir as a genre for a story. The story may be suggested to the user based on the matching genre.

Further, the content 212 may be sent to the user based on the information associated with the user such as, for example, age. The user may list their age as 8 years old and, as such, the content suggested to the user is age appropriate. In some embodiments, the content is based on a rating system as exemplified by the television parental guidelines. Further, the content may be based on age (information indicative of the user) in that the content 212 may be a birthday card and may be sent directly from one user to a user that is having a birthday. The birthday card may comprise uploaded images, video, audio, and haptics. Content may be filtered based on any combination of the criteria described above (or elsewhere), as well as based on a variety of other criteria that would be obvious to one of skill in the art on reviewing this disclosure.

As described above, the content 212 may be filtered by user preferences such as language, mood, verbosity, genre, rating, interests, associated groups, liked and disliked characters, and any other personal preference. For example, the content creator may create a story that provides content in slightly different ways based on an initial mood of the viewer. For example, a comic may be displayed in a darker tone with a slightly different storyline and accompanying music based on a viewer designation of "dark mood." Similarly, a user may want something uplifting. So, a comic is displayed or suggested that has an uplifting tone or the comic is displayed in a lighter tone with an uplifting ending as created by the content creator.

Multiple storylines, scenes, music, point of view, narrator, or any other design choice may be created to cater to the desires of the user. For example, in some embodiments, the content creator may create a story with more dialogue to carry the action than visual cues or vise verse. A user may indicate that they prefer more action and less dialogue so the version of the story with more action is provided.

A content creator may also provide content based on a moral sensitivity of the user. For example, the user may enjoy the gangster genre but indicate that they do not enjoy the violence. The content 212 may be filtered such that the violence is removed and only implied while still capturing the plot. Further, the user may indicate that they are only 12 years old. The content 212 may be rated similarly to television and film ratings such that a 12 year old is not subjected to language, violence, nudity, or any other situations that may be available for adult viewers but inappropriate for a younger audience.

In some embodiments, the content 212 is filtered by characters. A user may receive a suggestion for content with liked characters or content with disliked characters may be filtered out based on the user profile. For example, content creators may create multiple storylines comprising the same plot but the story is told through the eyes of two different characters. The user may indicate in the user profile that they prefer character A to character B. The content that is provided to the user is the storyline viewed through the eyes of character A. Further, any narration and interaction may only be provided by character A.

In some embodiments, the content 212 may be filtered to display based on time. For example, a content creator may create Halloween themed content. The content creator may make the content available from October 20 until November 2 to coincide with the holiday. As another exemplary embodiment, a musician may create audio and visual content that may play automatically to users located within a proximity to a location where the musician has an upcoming show, and further, at a designated time before the show. The content may also provide a schedule for shows as the music plays. In some embodiments, the users may interact with the content to view sub content such as seating arrangements at the show, alternative shows, and ticket prices. In some embodiments, the user may select an interaction point 220 and purchase tickets with a financial account associated with the application or may link to a third-party retailer.

In some such embodiments, the application may be linked to the live show. During the show the application may provide visual content to enhance the user experience. For example, the show may be a stage play of Les Misérables. The visual content may provide images or video of France and bloody battlefields and follow along with the story. The type of content available (audio, visual, haptic, etc.) may depend on the particular event. For example, the musician may provide audio content, while such content would typically be undesirable during a stage play.

In some embodiments, multiple screens per page may be displayed on the computing device while each screen is displayed individually on mobile devices. The application may be stored on or at least accessible by and run on a mobile device or a desktop computer. The application may determine the device on which the application is running and provide content based on the device.

Continuing with the exemplary embodiment depicted in FIG. 2, the content 212 may provide dialogue in the form of a dialogue bubble 218 with text. In some embodiments, the dialogue may be animated. For example, the dialogue may appear one letter at a time, or may scroll by, or change fonts or different colors based on audio or video in the scene. In some embodiments, the text in the dialogue bubble 218 and the dialogue bubble 218 itself may be selectable such that it provides a point of interaction to the user. In some embodiments, the user may click on or hover over the dialogue to receive more content such as information about the character or extra dialogue. In some embodiments, the user may interact with any text to see word definitions or further meaning of the text. Users may generally interact with any type of content element, including images, audio, and video in a variety of ways. For example, clicking an image might show an additional image, an animation might play, or a puzzle might be presented for the user to solve. In some embodiments, content can only be activated under certain circumstances, such as within a location or after solving a puzzle.

In some embodiments, the content provides interactive features. A user may select the point of interaction 220 such as the exemplary "X" on the screen, any item displayed in the illustration, and, as described above, the dialogue. The point of interaction 220 may provide audio of the dialogue, the illustration to become animated, haptic feedback through vibration, or any other feature that may be present on the mobile device or personal or desktop computer. In some embodiments, the interaction may open new screens or direct the user to different locations throughout the story. Further, at any point the user may interact with the content 212 via the interaction point 220 to provide user feedback, select options, or guess at outcomes of the story. This interactive feature provides variety and more control over the flow of the story by the user.

FIG. 3A depicts the secondary page 300 depicting secondary content 302 with the boy in the car from FIG. 2 and an animation 304 overlaid on the secondary content 302. In some embodiments, the secondary page 300 may be selected and viewed individually as a primary page. The animation 304 may also be viewed on the primary screen 214 where the secondary content 302 is presented in FIG. 2. The secondary page 300 may also be selected to provide interactive features. For example, when the interaction point 220 (e.g., the "X") presented on the secondary page 300 is selected by the user, animation, audio, text, a new screen, webpage, or any other content may appear. The exemplary animation 304 is presented overlaid on the secondary content 302. In some embodiments, the secondary content 302 may be overlaid on the primary screen 214 and the animation 304 or video may be overlaid on the secondary content 302 on the primary screen 214. In some embodiments, when the interaction point 220 is selected, a new screen appears. The new screen may provide any other content such as, for example, an image and dialogue or a video or in some embodiments, an audio bar as depicted in FIG. 3B.

In some embodiments, the size and placement of a screen such as, for example, the secondary screen 300 may be determined by the device that is being used. For example, if a personal computer is used to view the content, the screens may be displayed overlaid (FIG. 2), side-by-side, or in a collage-type pattern. If a mobile device with a smaller screen is used, the content may be displayed one screen at a time in order to display the content such that it is easy to see on the smaller screen.

In some embodiments, the user may customize the display. For example, the user may wish to view a particular screen of a displayed multiple screens more closely. The user may select a menu and customize the page to view only that screen. In some embodiments, the user may simply click the screen in which the user wishes to view and the screen zooms in or is displayed by itself. In some embodiments, the user may drag the screens to different locations of the display or may drag the screens for zooming and close-up viewing.

FIG. 3B presents side-by-side screens presenting different content. The left screen 306 presents a woman and dialogue 308 and the right screen 310 presents an audio bar 312 displaying the time for the audio. The audio may be editable by the user interacting with the audio bar 312 such that the user may drag the audio bar 312 to different locations to fast forward or rewind the audio. In some embodiments, the audio bar 312 may provide volume, pause/play, and a menu to access different features for presenting the audio.

In some embodiments, the audio bar 312 is overlaid over the left screen 306 and the dialogue 308 is associated with the audio. For example, the dialogue 308 "I'll find you Sam. I love you," may be presented as audio and the audio bar 312 associated with the audio may be overlaid on the image of the woman thus creating the effect that the woman is saying the words. In some embodiments, the woman is depicted and animated such that her mouth moves and the audio is played without the audio bar 312 to provide a realistic effect. These features may be selected by the content creator.

In some embodiments, additional information may be obtained with a user level access. For example, the user may select the "Click to see extra blue-level content" icon 314. The user may then be directed to a separate page or a new screen may appear providing new content as described in regard to FIG. 4 below.

In an exemplary embodiment depicted in FIG. 4, the user may click on icon or interaction point 220 provided in FIGS. 2 and 3A and a new screen 400 or window opens. The new screen 400 may display any content including dialogue and storyline content as well as options to access bonus content and rewards as described in embodiments herein. For example, the new screen 400 may appear when the icon 314 is selected in FIG. 3B.

In some embodiments, the blue level content 402 provided in FIG. 4 displays the dialogue 404 and options for viewing extra user-level content 406. The user-level content 406 may be associated with a status of the user such as beginner, intermediate, or expert. Similarly, the user level or status may be determined by an amount of time and/or money spent interacting with the content. Further, the user level may be based on the user's success in games or progress through content and on aspects of the content such as the completion of puzzles, challenges, and adventures. For example, a user may complete virtual puzzles or solve a series of cryptic clues provided by the user-level content 406. Further, the user may check-in in real life at a particular location described in the user-level content 406. The more interaction and specific puzzles and tasks completed may provide the user with badges that may be traded for, or the equivalent virtual or fiat value of, unlocked content, points, higher level status associated with the user and the user account, or any other reward or bonus as described herein. For example, the user-level content 406 may provide clues to the user based on the story and the user may decipher that the clues relate to the Santa Monica Pier. Once the user checks in at the Santa Monica Pier the user receives red level content or receives a high level status associated with their account. Although colors are used to depict levels of content in this disclosure, the user-level content may not be described by colors but may be numbers or any other method of arranging the different low to high levels. In some embodiments, levels of content may not be ordered at all, but instead each item of content linked to a particular clue discovered, location visited, story flag set, or similar.

In some embodiments, the user may share the user-level content 406 with an associated group. The user may be part of a collective group of users that, for example, are trying to solve a mystery provided by the content 212. The user's activity, bonuses, and user-level content may be shared. The user may opt-in to a group that may be suggested based on similar profiles of members in the group. Group members may support other members by providing them badges and clue sharing at points in the games that allow the users to move on to the next level or to new content. In some embodiments, the content creators create the content specifically for group users. In other embodiments, content creators can make their content (either entire works or individual elements of content) accessible by selected groups. For example, certain content may be accessible by all users, paying users only, user that have unlocked a particular tier (e.g. gold-level users), affinity groups (e.g., fans of a particular topic or activity), or by particularly identified users (or a single user).

Further, at any point the user may interact with the content 212 to provide user feedback, select options, or guess the outcome. For example, options for what the user or character in a story should do next may be provided as in a choose-your-own-adventure type story. This may be provided by the user level-content 406. The content 212 provided may be based on these user selections in the user-level content 406. Further, the user may interact with the content 212 to play games and the content 212 provided may be based on the outcome of the game. This may add an excitement to the selection such that the user may have to problem solve or be skillful at a game in order to get a desired outcome.

FIG. 5A depicts the secondary screen 216 from FIG. 2. In some embodiments, the secondary screen 216 is displayed side-by-side with the primary screen 200 and in other embodiments, the secondary screen 216 may be provided as a lone screen such as on a mobile device display as described above. In some embodiments, the dialogue 402 may be displayed along with the secondary screen 216 and the secondary content may be audio, video, haptics, or any other information provided to the user.

In the embodiment depicted in FIG. 5A, an "X" indicates an interaction point 220 where the user may select the "X" to receive the secondary content as described above. Upon selecting the "X," via the mobile device, a new screen appears presenting a map 500.

FIG. 5B depicts an embodiment where the map 500 is provided based on the content. In some embodiments, the map 500 may further be based on a location of the user. The content may be based on the map 500 and the map 500 may be provided based on the location of the user as accessed via the computer device or mobile device of the user. In some embodiments, the map 500 depicts the real world and in other embodiments, the map 500 is representative of a fictitious location associated with the content of the story. Though a fictitious location is provided in the map 500 the user location may still be used to provide the user an interactive experience.

Locations and distances from the user mobile device may be relative to content provided by the application and displayed on the map 500. The user's GPS, accelerometers, gyroscopes, compass, cameras, and any other information may be used to determine the user's location, a direction the user is facing, and in which direction the user is traveling. For example, different locations in a user's house may be associated with different locations in the digital world such that measurements such as feet in the real world relate to miles in the digital world. Further, for example, the user's living room may be a night club in New York in the digital world and the user's backyard may be a farm in Kansas. The user may move to the different locations around the user's house to move throughout the story gaining points and level changes along the way. In some embodiments, the locations are mapped to a 1:1 ratio such that the user may have to go to New York and Kansas to access the content provided in the application at the virtual New York and Kansas locations. In some embodiments, the application may provide incentives such as discounted plain tickets or car rentals. In some embodiments, a user in New York may be linked to a user in Kansas such that the users may form a group to complete the mission.

In some embodiments, the map 500 is representative of, or depicts, real-life locations. For example, the map 500 may display actual highways, streets, houses, business, mountains, trails, and other man-made as well as natural locations. In some embodiments, the map 500 is provided by the application accessing the sensors on the mobile device as described above. In some embodiments, the application accesses and communicates with other applications on the mobile device to generate the map 500 with overlaid content from the application such as the user-level content 406 and images. The overlaid virtual objects may create an augmented reality for the user and is discussed in more detail below.

The exemplary map 500 depicted in FIG. 5B may display parts of, for example, Los Angeles. For example, the map 500 may display locations around Los Angeles and provide locations that the user may visit to advance the story or gain rewards. The application may track the user by accessing sensors and peripheral devices such as GPS, accelerometers, or any other sensors as described above. In some embodiments, the user may simply check in at a location using GPS, photographs, or social media, and the application obtains the information to provide associated content. In some embodiments, the user may receive rewards for checking in using social media accounts and tagging and promoting the application and the content. For example, the application provides a clue to the story and the user finds out from a red level clue that the clue is located somewhere around the Santa Monica Pier. The map 500 provides directions from the user location to the Santa Monica Pier. As the user travels to the Santa Monica Pier, the application may track the users progress and provide incentives along the way. For example, the application may send notifications, and push notifications based on the user's location, to the user's mobile device, email, or account making offers to gain badges. For example, the user may drive past a billboard promoting the application and the application sends a notification to "take a selfie with the billboard and upload to a social media site and receive a green-level clue." The user performs the task and receives a green-level clue via the application that states, "the reward is under the Pier."

FIGS. 6A-B depicts an embodiment where a scene is presented to the user based at least in part on the user location. For example, the user may drive to the Santa Monica Pier based on information provided by the application content and the map 500. The application obtains information from the user's mobile device and determines that the user is in proximity to the Santa Monica Pier and the application then sends a message to the user indicating that the user initiate the video camera feature of the mobile device or an associated peripheral camera. The user performs the requested task by displaying the pier scene 602 and the pier 604 is shown in the display from the user's camera. In some embodiments, an exemplary pier is shown and in some embodiments the view from the camera is shown. When the user is at the pier 604, the user may walk under the pier 604 and scan the environment 608 as depicted in FIG. 6B. The application may virtually place the chest 610 in the environment 608 under the pier 604 in an augmented reality scene. In some embodiments, the chest 610 is a virtual object and the environment 608 is a real-world location such as the beach or Santa Monica Pier. In some embodiments, the environment 608 is a virtual-world environment such as provided by the content 212.

In some embodiments, the user may not be in the real-world location and may be using a personal computer as well as a mobile device. If the user is not at the real-world location, the user may swipe or angle the device to show different angles as the pier 604 is presented on the screen. The image depicted in FIG. 6A shows an arrow 606 indicating that the user may swipe or angle the mobile device in a downward looking angle and the application obtains information from a sensor such as, for example, the accelerometer of the mobile device. Once the action is performed the chest 610 is revealed in an augmented reality scene to the user.

In some embodiments, the user may take a photograph and the reward (chest 610) is overlaid. In some embodiments, the reward is provided directly through the application and the application uses a stock photograph from the actual Santa Monica Pier. In some embodiments, location-based content 406 is provided. Location-based content 406 may be content based on the location of the user and the object such as the map 500 and information to travel from the user's location to the object location such as the pier 604. Further, the location-based content 406 may be information provided at particular locations such as when the user is in proximity to the chest 610 a notification may be sent requesting the user to look under the pier 604.

In some embodiments, the chest 610 is provided with user-level content 612. The user-level content 612 may be secondary content 614 as described above, dialogue, and further rewards, or options for rewards and badges.

In some embodiments, the application offers a night mode. Night mode may be a no-video mode that provides interactive features through audio and haptics only. Night mode may provide a unique experience for the user as well as for visually impaired users. For example, the night mode may provide a black screen that accepts inputs such as swipes, taps, drags, or any other input though a touchscreen, mouse, keyboard, or any other input. In some embodiments, the application accesses the microphone of the computing device to obtain audible responses from the user along with speech recognition to analyze and provide feedback to the user. The user may interact with the application by listening to the story via a microphone or headphones and respond by interacting with the computing device inputs. The input methods and the audio may be customizable to the user's preferences. Night mode may be utilized with any of the embodiments of the systems and methods provided herein.

In some embodiments, the application may communicate with and share information with other applications through a bi-directional Application Program Interface (API). For example, a user may play a game online or via a computing device. At a point in the game the application may receive an alert that the user is playing the game send a notification to the user regarding content such as rewards or level changes. The user may select to use rewards and badges from the content to further their progress in the game or vise verse. The application may further be associated with the outcomes of the games such that playing the game may provide extra content or unlock features and provide badges to the user that may be redeemed for any rewards, bonuses, or extra content.

In some embodiments, the bi-directional API may further be used to retrieve the correct content for the user from a server storing the various content from the creator. For example, plot twists or the outcome of the story based on particular choice may be stored on the server and only retrieved on demand to prevent the user from peeking ahead by examining the game files. In other embodiments, content retrieved by the user may be dynamic. For example, if the user visits a plot-relevant location after a deadline has passed, the user may be served different content than another user who met the deadline. Furthermore, content may be public content, private content hosted on the server, advertising content, or any other type of content.

In some embodiments, the user, in this case a content creator, may release content based on time in a storyteller mode. The content creator may release a select number of pages or information periodically such that the consumer may read along as a live event. During the event the content creator may be available for questions or provide live audio and video and supplemental content to accompany the content release. In some embodiments, the content creator may provide in-person readings and releases.

In some embodiments, the user may access the application to listen to or view content related to the user location. For example, the user may be at a museum or a zoo. The user location may be accessed and the user may be automatically notified that audio and video are available for the exhibit. In some embodiments, a barcode or a QR code may be scanned next to a painting or an animal viewing area to initiate the recording. In some embodiments, a proximity tag such as a Radio Frequency Identification (RFID) tag may alert the mobile device that the user is in proximity to the Mona Lisa at the Louvre. Content related to the history of the Mona Lisa and Leonardo da Vinci may be provided by the application based on the location from GPS or any other sensor described. Any of this content may be location-based content. Similarly, one or more people (e.g., the content creator or paid actors/participants) may have special barcodes or QR codes on their mobile device that unlock access to content. Clues can then assist users in locating the person to access the content. For example, the user's mobile device could give the user clues that they are near (or approaching) a person of interest and/or clues as to how to identify the person. Once the person of interest is located, content related to that person can be automatically unlocked based on location or via scanning a code they provide. Relatedly, this feature can be opened to all users to provide a game of tag or similar by allowing user to locate and identify each other in public.

Some embodiments of the invention may be represented by the exemplary method 700 depicted in FIG. 7. Initially at a step 702, the application is downloaded on the mobile device or computer or accessed via the Internet or in a cloud based application or system. The user, in the exemplary case of a new user, is prompted to set up a profile on an account for use with the application as described in embodiments presented above. The user may input such exemplary items as age, gender, location, favorite books, genre, movies, comics, anime, hobbies, verbosity, holiday, or any information that may be relevant to providing the user with a unique interactive experience. The user may further set up, or connect, a financial account for transmitting and receiving funds to purchase content, create content, and receive rewards. The user may select an option to create an account for a content creator to upload and share content as well as consume content from other users. Further, the user account may be edited and updated with analysis as described in step 710 below.

At a step 704, the user may upload and create content as described in embodiments presented above. In some embodiments, the user may create content using the application or using a separate application the user may upload content to the application. The content may be visual, audible, textual, and haptic and may be based at least in part on information indicative of the user and information associated with the user as determined from the user profile. The user may place the content at a location on a screen, define the content on the screen, and provide an order and times in which the content is viewed. The content creator may also provide interactive features such that the user may select and provide input and content may be provided based on the user input.

At a step 706, the content creator may set conditions for how the content is shared and suggested to users and how the user's access the content or, otherwise, how the content is provided to the user. For example, the content may be provided to the user based on the user profile as described in embodiments above. The content may be provided to the user based on information associated with the user such as age, nationality, language, gender, hobbies, interests, and preferences. The preferences may be types of animals, favorite characters, genres, books, movies, mood, verbosity, action vs dialogue preference, or any other preference that may adjust the content to be better suited to the user.

Further, the content creator may set conditions for when content is available. For example, the user may access the content while in proximity of a particular location based on sensors associated with the user's computing device running the application. In some such embodiments, the user may be rewarded with increasing tiers of content as they visit additional predetermined locations in a particular timeframe, as in a scavenger hunt-type game. In some embodiments, content may be shared with, or made available to, the user based on other games or applications associated with the application as described above. In some embodiments, the content may be shared publicly or only within a group or subgroups designated by the content creator or the user.

Furthermore, the content provided to a user may depend on the outcome of a puzzle or game. For example, a user might play a game and if they win, a first piece of content is displayed; if they lose the game, other content is displayed. In the above example, the "game" might be a puzzle, other inline game, or any element dependent on user interaction. Furthermore, in some embodiments, the outcome of a game may be completely random and not dependent on user interaction. For example, a content creator may create two paths for a particular item of content and the path selected is chosen at random to increase variability or replayability.

Additionally, a content creator may filter content availability based on group membership or participation. For example, bonus content may only appear when a particular number of group members (or of users generally) are within a particular range of each other (e.g., at the same venue or plot location). In some such embodiments, the amount of bonus content may depend on the number of participants gathered. For example, a television content producer may produce bonus content that is only available if a certain number of viewers are gathered for a television viewing party. Similarly, if a certain number of attendees are gathered for a release party for a novel or comic, all attendees may have bonus content unlocked. In some such embodiments, the gathered participants may play a game or participate in a contest or quiz to unlock additional content. For example, at a television viewing party, the winner of a trivia contest may unlock additional bonus content.

At a step 708, the user may access and interact with the content. In some embodiments, the user's interaction with the content is tracked. The tracked interaction may be used to store information indicative of the user's interaction. For example, the user may select between two pathways in a choose your own adventure style story. Pathway A leads to the countryside and Pathway B leads to the city. The user selects Pathway A. The application may store the information such that the user prefers the countryside.

In some embodiments, the user may provide feedback such as filling out a questionnaire, or a rating system. As in the example provided above, when the user selects the countryside the application may provide a question in the questionnaire based on the content interaction such as "do you prefer the countryside to the city?" The responses to the questionnaire and any other interaction may be store for analysis and comparison to other users.

At a step 710, the information obtained from the user is analyzed to create a better user experience. Some embodiments of the invention utilize machine learning, neural networks, fuzzy logic, or any other statistical, or general mathematical algorithm or artificial intelligence to increase the efficiency of the application and create a more user-friendly experience by analyzing and updating the content that is provided to the user and the user interactions. In some embodiments, the content creator may have access to the results of the analysis and the application may suggest to the content creator adjustment to be made to the content and the method in which the content is presented as described above. In some embodiments, the data for all users is collected and compared to map trends and correlations. The mathematical algorithms may be used along with user feedback to increase customer satisfaction and cater the content specifically to the preferences of each user and groups of users based on similar likes, dislikes, and choices while interacting with the content.

In an exemplary method represented by the flow chart 800 the user consumes and interacts with the content. At a step 802 the user may set up an account as described in the exemplary method represented by the diagram 700 described above. The user may enter preferences such that the content may be catered to the user specifically based on other user's feedback and interactions with similar preferences.

At a step 804, the user connects with other users of similar preferences and may associate with groups. The information associated with the user such as, for example, the user preferences, may be used to suggest or link the user with other users and content creators of like preferences to provide and share content as described in embodiments above. In some embodiments, the content is shared publicly, with groups, or subgroups, and in some embodiments, it may be a decision by the user to share content, badges, or any other information. In some embodiments, users may have the ability to broadcast content (or broadcast indications of the availability of content) that they subscribe to or have unlocked in addition to profile properties. In such embodiments, the user may be able to select and/or customize the content they broadcast. Similarly, the user may select times, dates and locations when they broadcast content. Other users located with range of the broadcast (which may also be configurable by the broadcasting user) can view the content being broadcast. Viewing users may also be broadcasting, and vice versa. Viewing users may form an ad hoc group (or a longer-duration group) during the duration of the broadcast, and be able to interact with each other and with the broadcasting user.

At a step 806, the user consumes the content while interacting with the content and the application as described in embodiments above. The content may be provided based on the user location, the information indicative of the user, the user preferences, information associated with the user such as, for example, the user groups, the user interactions, and the user status level as described in embodiments above.

At a step 808, the user interacts with the application and the interactions may be tracked and stored with the information indicative of the user and the information associated with the user and the user may provide feedback. The application may solicit feedback. For example, the application may provide questions to the user to gain feedback from the user to provide a more efficient system with content more customized to the preferences of the user. The questions may be analyzed together with other user information to determine the way and the time in which content is presented to the users.

Steps described in the exemplary methods above may be omitted, rearranged, and added as desired. Although the invention has been described with reference to the embodiments illustrated in the attached drawing figures, it is noted that equivalents may be employed and substitutions made herein without departing from the scope of the invention.

Having thus described various embodiments of the invention, what is claimed as new and desired to be protected by Letters Patent includes the following:

The invention claimed is:

1. One or more non-transitory computer-readable media storing computer-executable instructions that, when executed by at least one processor, perform a method of generating interactive content, the method comprising:

causing display of a creator graphical user interface (GUI) at a creator computer for creation of the interactive content by a creator;
receiving a plurality of inputs by the creator GUI from the creator computer to create a multimedia program comprising the interactive content;
storing the multimedia program at a data store directly accessible by an application stored on a user computer, wherein the data store is accessible by cloud-based provisioning;
generating an interactive GUI associated with the multimedia program and configured to be provided directly to a user and displayed as a single stand-alone interface by a user display associated with the user computer, the interactive GUI providing:
  the interactive content comprising a progression of events created by the creator displayed on a plurality of pages,
  wherein a page of the plurality of pages is configured to display user content received from the user,
  a plurality of event branches providing the progression of the events based on input by the user,
  a plurality of interactive buttons positioned intermittently throughout the progression of the events on the plurality of pages providing the interactive content,
  said plurality of pages comprising a plurality of screens,
  wherein a position and a size of each screen of the plurality of screens is defined by the plurality of inputs,
  media content comprising audio and video, and
  an annotation of the media content for display with the media content;
receiving, from the interactive GUI displayed by the user computer, a request to access the interactive content;
providing, directly from the data store, the interactive content to the user computer;
providing, to the user via the user computer, a branch of the plurality of event branches of the interactive content based on selections of the plurality of interactive buttons positioned intermittently throughout the progression of the events;
guiding the user to a destination location to further advance an illustrated storyline of the branch of the plurality of event branches of the interactive content, wherein the destination location is one of a plurality of real-world locations;
automatically providing a first notification to the user to initiate a camera of the user computer in response to detection that the user physically arrives at the destination location;
in response to detecting that the camera is initiated, identifying a capture location to capture with the camera;
adding at least one virtual object into a display of the camera in response to the identified capture location at the destination location;
unlocking interested content based on the identified capture location;
receiving, by the interactive GUI, a user video or an illustration from the user;
storing the user video or the illustration from the user in the data store accessible by the cloud-based provisioning;
updating the interactive content to include the user video or the illustration provided by the user;
storing the updated interactive content in the data store; and
providing to a second user, via a second user GUI and directly from the data store by the cloud-based provisioning, the updated interactive content comprising the user video or the illustration.

2. The one or more non-transitory computer-readable media of claim 1, wherein the interactive content comprises one of a story, a game, a puzzle, and a reward.

3. The one or more non-transitory computer-readable media of claim 1, wherein the method further comprises:
generating a virtual object;
receiving user video content from the camera of the user computer; and
causing display of the virtual object with the user video content,
wherein the display of the virtual object and the user video content is displayed as augmented reality while the user is capturing the user video.

4. The one or more non-transitory computer-readable media of claim 1, wherein the method further comprises generating the interactive content in a night mode such that haptics and the audio are generated, and the video is not displayed.

5. The one or more non-transitory computer-readable media of claim 1, wherein the method further comprises:
presenting a puzzle to the user by the user computer; and
selecting a solution branch of the plurality of event branches of the interactive content based at least in part on a user's solution to the puzzle.

6. The one or more non-transitory computer-readable media of claim 1,
wherein the interactive content is a graphic novel, and the plurality of pages present the graphic novel,
wherein the plurality of pages of the graphic novel advances a storyline of the graphic novel,
wherein the plurality of pages include the plurality of interactive buttons,
wherein the method further comprises:
  providing a new branch of the plurality of event branches based at least in part on a user selection of a button of the plurality of interactive buttons.

7. The one or more non-transitory computer-readable media of claim 1, wherein the interactive content is configured such that the user may interact with the interactive content via a touchscreen on the user computer.

8. One or more non-transitory computer-readable media storing computer-executable instructions that, when executed by at least one processor, perform a method of generating interactive content, the method comprising:
causing display of a creator graphical user interface (GUI) at a creator computer for creation of the interactive content by a creator;
receiving a plurality of inputs by the creator GUI from the creator computer to create a multimedia program comprising the interactive content;
storing the multimedia program at a data store directly accessible by an application via cloud-based provisioning;
generating an interactive GUI associated with the multimedia program and configured to be provided directly to a user to be displayed by a single stand-alone interface by a user display associated with a user computer,
wherein the user is distinct from the creator;

the interactive GUI providing:
the interactive content comprising a progression of events created by the creator to be displayed on a plurality of pages,
wherein a page of the plurality of pages is configured to display user content received from the user by the user display,
a plurality of event branches providing the progression of the events based on input by the user,
a plurality of interactive buttons positioned intermittently throughout the progression of the events on the plurality of pages providing the interactive content,
media content comprising audio and video, and
an annotation of the media content for display with the media content;
receiving, from the interactive GUI displayed by the user display of the user computer, a request to access the interactive content;
providing, directly from the data store, the interactive content to the user computer based on a profile of the user;
providing, to the user computer, a branch of the plurality of event branches of the interactive content based on selections of the plurality of interactive buttons positioned intermittently throughout the progression of the events;
guiding the user to a destination location to further advance an illustrated storyline of the branch of the plurality of event branches of the interactive content, wherein the destination location is one of a plurality of real-world locations;
automatically providing a first notification to the user to initiate a camera of the user computer in response to detection that the user physically arrives at the destination location;
in response to detecting that the camera is initiated, identifying a capture location to capture with the camera;
adding at least one virtual object into a display of the camera in response to the identified capture location at the destination location;
unlocking interested content based on the identified capture location;
receiving, by the interactive GUI, a user video or an illustration from the user;
storing the user video or the illustration from the user in the data store accessible by the cloud-based provisioning;
updating the interactive content to include the user video or the illustration provided by the user;
storing the updated interactive content in the data store; and
providing to a second user, via a second user GUI and directly from the data store by the cloud-based provisioning, the updated interactive content comprising the user video or the illustration.

9. The one or more non-transitory computer-readable media of claim 8, wherein the interactive content is an interactive novel, and the events progress a storyline of the interactive novel.

10. The one or more non-transitory computer-readable media media of claim 9, wherein the interactive novel is told from a point of view of different characters for different users based on the profile of the different users.

11. The one or more non-transitory computer-readable media of claim 8, wherein the method further comprises:
generating a virtual object;
receiving further user video captured by the camera of the user computer; and
causing display of the virtual object with the user video by the interactive GUI.

12. The one or more non-transitory computer-readable media of claim 8, wherein the method further comprises generating the interactive content in a night mode such that haptics and the audio are generated, and the video is not displayed.

13. The one or more non-transitory computer-readable media of claim 8, wherein the method further comprises:
presenting a puzzle to the user by the user computer;
selecting a solution branch of the plurality of event branches of the interactive content based at least in part on a user's solution to the puzzle.

14. The one or more non-transitory computer-readable media of claim 13, wherein the interactive content is configured such that the user may interact with the interactive content via a touchscreen on the user computer.

15. A method of generating interactive content, the method comprising:
causing display of a creator graphical user interface (GUI) at a creator computer for creation of the interactive content by a creator;
receiving a plurality of inputs by the creator GUI from the creator computer to create a multimedia program comprising the interactive content;
storing the multimedia program at a data store directly accessible by an application via cloud-based provisioning;
generating an interactive GUI associated with the multimedia program and configured to be provided directly to a user to be displayed as a single stand-alone interface by a user display associated with a user computer,
wherein the user is distinct from the creator;
the interactive GUI providing:
the interactive content comprising a progression of events created by the creator displayed on a plurality of pages,
wherein a page of the plurality of pages is configured to display user content received from the user by the user display,
a plurality of event branches providing the progression of the events based on input by the user,
a plurality of interactive buttons positioned intermittently throughout the progression of the events on the plurality of pages providing the interactive content,
said plurality of pages comprising a plurality of screens,
wherein a position and a size of each screen of the plurality of screens is defined by the plurality of inputs,
media content comprising audio and video, and
an annotation of the media content for display with the media content;
receiving, from the interactive GUI displayed by the user computer, a request to access the interactive content;
providing, directly from the data store, the interactive content to the user computer;
providing, to the user via the user computer, a branch of the plurality of event branches of the interactive content based on selections of the plurality of interactive buttons positioned intermittently throughout the progression of the events;
guiding the user to a destination location to further advance an illustrated storyline of the branch of the plurality of event branches of the interactive content, wherein the destination location is one of a plurality of real-world locations;

automatically providing a first notification to the user to initiate a camera of the user computer in response to detection that the user physically arrives at the destination location;

in response to detecting that the camera is initiated, identifying a capture location to capture with the camera;

adding at least one virtual object into a display of the camera in response to the identified capture location at the destination location;

unlocking interested content based on the identified capture location;

receiving, by the interactive GUI, a user video or an illustration from the user;

storing the user video or the illustration from the user in the data store accessible by the cloud-based provisioning;

updating the interactive content to include the user video or the illustration provided by the user;

storing the updated interactive content in the data store; and providing to a second user, via a second user GUI and directly from the data store by the cloud-based provisioning, the updated interactive content comprising the user video or the illustration.

16. The method of claim 15, further comprising:
obtaining a location of the user computer;
generating a virtual object based on the location of the user computer; and
causing display of the virtual object by the user computer based on the location of the user computer.

17. The method of claim 15, wherein the interactive content comprises one of a story, a game, a puzzle, and a reward.

18. The method of claim 17,
wherein the user computer is a mobile device,
wherein the interactive content comprises haptic feedback.

19. The method of claim 18, further comprising:
causing display of a map to the user comprising a user location of the user and an object location of a virtual object at a real-world location by augmented reality.

20. The method of claim 19,
wherein the interactive content is an interactive novel, and the events progress a storyline of the interactive novel,
wherein the interactive novel is told from a point of view of different characters based on a profile of the user.

* * * * *